(No Model.)
J. DAY.
LAMBREQUIN PIN.
No. 418,693. Patented Jan. 7, 1890.
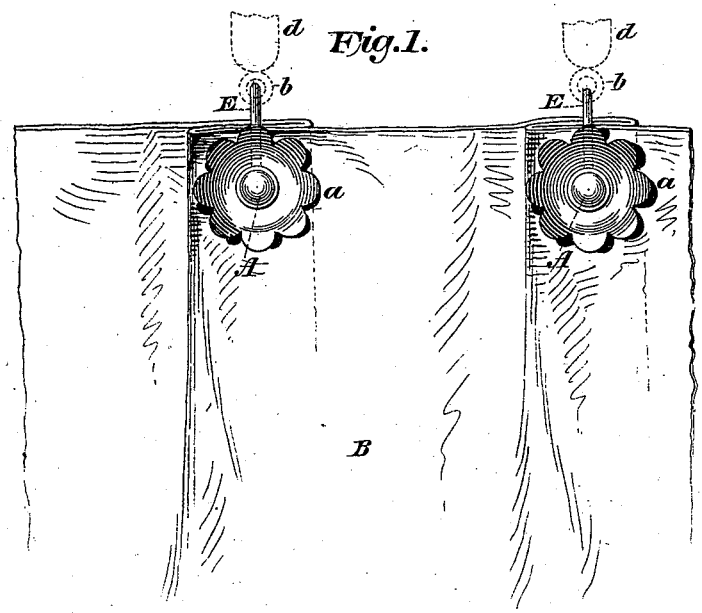
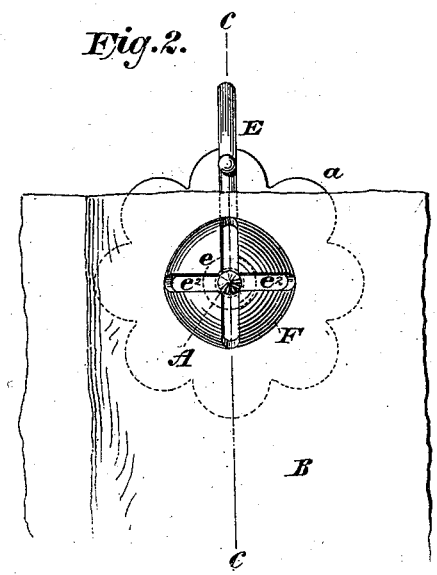
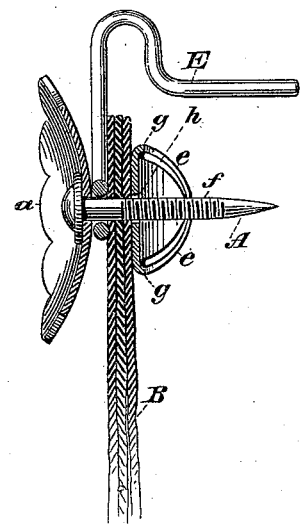
WITNESSES:
Gustave Dieterich
T. F. Bourne.
INVENTOR
John Day
BY Briesen, Steele & Knauth
ATTORNEYS.

UNITED STATES PATENT OFFICE.

JOHN DAY, OF NEW YORK, N. Y.

LAMBREQUIN-PIN.

SPECIFICATION forming part of Letters Patent No. 418,693, dated January 7, 1890.

Application filed October 10, 1889. Serial No. 326,600. (No model.)

*To all whom it may concern:*

Be it known that I, JOHN DAY, a resident of New York city, county and State of New York, have invented an Improved Lambrequin or Curtain Pin, of which the following is a specification.

The object of my invention is to provide a lambrequin or curtain pin that can be easily and quickly placed in position upon the curtain and that will remain securely attached to the curtain.

The invention consists in the combination, with a threaded pin or stud adapted to pass through a curtain, and a hook carried by said threaded pin, of a nut having spring-jaws adapted to slide freely on the screw in one direction and to hold against the threads of the screw when moved in the opposite direction, as hereinafter more fully set forth.

Reference is to be had to the accompanying drawings, forming part of this specification, wherein—

Figure 1 is a side view of a portion of a curtain, showing my improvements in position. Fig. 2 is a similar view, looking at the opposite side of the curtain to that shown in Fig. 1; and Fig. 3 is a vertical cross-section on the line $c\,c$, Fig. 2.

The letter A represents a threaded pin or screw adapted to pass through a curtain B, said threaded pin or screw having a suitable enlargement or head $a$ at one end.

E is a hook of suitable shape carried by the pin A and adapted to pass through the eye $b$ of a curtain-ring $d$, (see dotted lines, Fig. 1,) whereby to suspend the curtain. The hook E is preferably swiveled upon the pin A, as shown in Fig. 3, so that the hook may adjust itself to the position of the curtain suspended from the pin A; but it is evident that the hook E may be connected with the pin A in any desired manner.

F is a hollow nut having spring-jaws $e$, the ends of which are adapted to enter the threads $f$ on the pin or screw A. The nut F is formed by cutting out of the material of the sheet metal a number of slits $e^2$ at suitable angles to each other and bending the intermediate parts over and toward each other, as shown in Fig. 3, whereby the spring-jaws $e$ are formed. The head or body part $g$ of the nut F is provided with a central aperture $h$, which is slightly larger than the threaded pin A, so that said pin can freely pass through said aperture. The ends of the spring-jaws $e$ are situated in line with the opening $h$, projecting over the same, leaving a small space between them through which the pin A may pass, while the ends of the spring-jaws come in contact with said pin. When the nut is placed upon the pin, as in Fig. 3, it can be slid thereon toward the head $a$, the spring-jaws slipping over the threads of the nut; but the nut cannot be moved off the pin or in the reverse direction without turning it, because the ends of the spring-jaws $e$ enter the threads on said nut and prevent its spontaneous removal; but by turning said nut in the ordinary manner it can be unscrewed from the pin.

By the above arrangement the curtain-pin can be easily placed upon the curtain by first passing it through the curtain and then slipping the nut upon the pin, as shown in Fig. 3, until the curtain is confined between the head of the pin or the hook E and the nut F, and all danger of the curtain-pin becoming disengaged from the curtain is overcome.

Having now described my invention, what I claim is—

1. The combination of the threaded screw A and the hook E with the clamping-nut F, having spring-jaws $e$, which nut is adapted to be slipped over the threads of said screw when pushed toward the head of the same, but which must be turned when to be moved in the opposite direction, substantially as described.

2. The pin A and hook E, combined with the nut F, having aperture $h$ and spring-jaws $e$, the ends of which project over the opening $h$, substantially as described.

JOHN DAY.

Witnesses.
 ROSCOE K. INGALLS,
 JOHN M. SPEER.